UNITED STATES PATENT OFFICE.

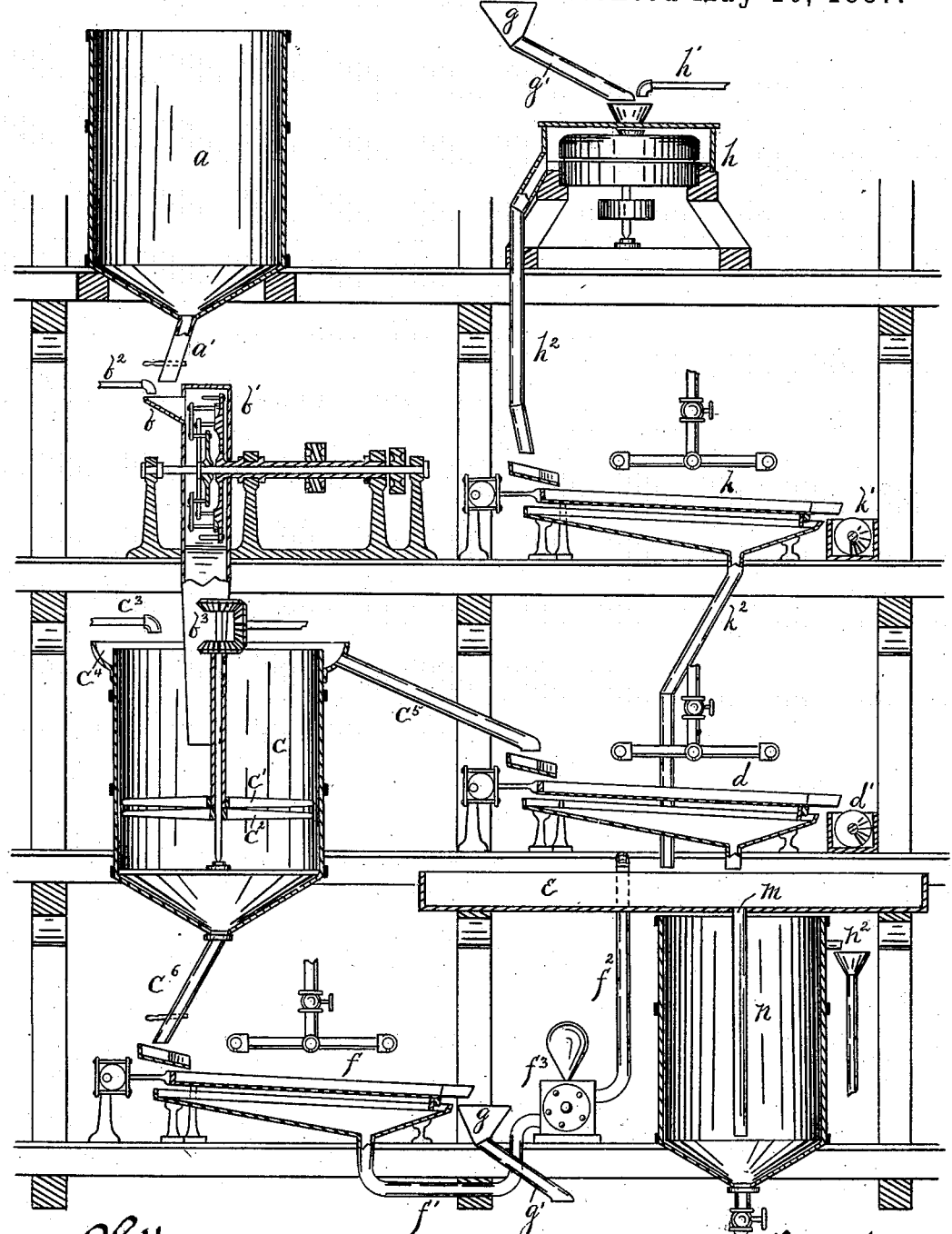

GILBERT S. GRAVES AND ROGER W. GRAVES, OF BUFFALO, NEW YORK.

METHOD OF MANUFACTURING STARCH.

SPECIFICATION forming part of Letters Patent No. 362,502, dated May 10, 1887.

Application filed October 13, 1886. Serial No. 216,137. (No model.)

*To all whom it may concern:*

Be it known that we, GILBERT S. GRAVES and ROGER W. GRAVES, citizens of the United States, residing at Buffalo, in the county of Erie and State of New York, have invented certain new and useful Improvements in the Method of Manufacturing Starch; and we do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

Prior to our invention starch has been obtained from grain in a variety of ways, some involving a great outlay for the necessary plant and an unnecessary consumption of time, while others have failed in effecting a thorough separation of the starch from the germ and bran which go to form the waste product known as "feed."

The object of our invention is to avoid the above-named difficulty, which we do by subjecting the grain, together with a proper amount of water, to a continuous series of manipulations, which, taken separately or in groups, are well known in the manufacture of starch, but which go to form, as an entirety, an improved process by means of which a greater yield of starch is necessarily obtained in a reliable and expeditious manner.

We will now proceed to explain, with the aid of the drawing, the preferred manner in which we contemplate carrying out our invention.

The drawing represents a vertical section of the apparatus.

Referring to the drawing, $a$ is the tank, in which the corn is steeped from twenty to sixty hours in water of a temperature of from 130° to 150° Fahrenheit. The steeped corn is passed down through the discharge-pipe $a'$ into the hopper $b$ of a disintegrator, $b'$, and with water from the pipe $b^2$ is fed into the disintegrator, which consists of a chamber, within which series of pins or beaters are rapidly revolved in opposite directions, which serve to break up the softened corn and free the germs therefrom. A roller-mill, with the rolls set sufficiently apart to thoroughly break up the grain without destroying the integrity of the germ, might be used instead of the disintegrator, which, however, is the preferred device.

The entire product of the disintegrator passes down the pipe or outlet $b^3$, and is discharged into the cone-tank $c$, where a separation of the liberated germs from the balance of the mass is to be effected. This tank $c$ is provided with an agitator, or, preferably, two agitators, (shown at $c'$ and $c^2$,) which are revolved slowly in opposite directions, in order that the water fed into the tank from the pipe $c^3$ may have a continuously level surface. The pipe or outlet $b^3$ extends considerably below the surface of the water in the tank $c$, and discharges its contents toward the bottom of the tank at the same time the pipe $c^3$ is supplying the tank with water in the proper proportion.

The agitators $c'$ and $c^2$ serve to break up the the mass discharged from the outlet $b^3$, and thereby liberate the germs, allowing them to rise to the surface. The tank $c$ has a gutter, $c^4$, surrounding its upper edge, into which the constantly-overflowing water carries the floating germs. From this gutter $c^4$ the germs are carried by pipe $c^5$ to the vibrating sieve $d$, by means of which any starch which may adhere to the germs is washed therefrom, and with the overflowing starch-milk is carried to the tank $e$, the germs themselves tailing over into the conveyer $d'$, where they are carried away to be sold as feed, or for any other purpose.

The balance or heavier portions of the grain settle to the bottom of the tank, and when a sufficient bulk thereof has accumulated to hold the water back it is drawn off through pipe $c^6$ for the final grinding in a quantity equal to that run in, in order to keep a uniform depth of water and an equal bulk of the crushed grain continuously in the tank; or, if preferred, two or three separating-tanks may be used, one being emptied while the other is being filled. This particular separating-tank $c$, with its agitators, overflow-gutter, &c., for freeing the broken mass of grain of the germs, we wish to reserve as subject-matter for a separate application to be simultaneously filed with the present application.

From the cone-tank $c$ the crushed grain, freed of its germs, is fed from pipe $c^6$ onto the vibrating sieve or separator $f$, which separates some of the starch prior to the final grinding. The starch-milk so separated is forced into the tank c through pipes f' and f² by the pump f³.

The mass which is to be subjected to the final grinding tails over the end of the vibrating sieve f and falls into the hopper g, and from thence through pipe g' is conveyed to the grinding-mill h; or, if preferred, the mass from the separating-tank c can be fed directly into the mill h without the use of the intermediate vibrating sieve, f, just described. In its passage through the stones of the mill h, which is supplied with water from pipe h', the mass is ground to the proper fineness to insure the complete separation of the starch from the bran and other portions of the grain. From the mill h the finely-ground mass is run through pipe h² upon the vibrating sieve k, from which the refuse or tailings go to the conveyer k', and the starch-milk is conveyed to the tank c through pipe k². The starch-milk collected in the tank c passes down through the pipe m, and is discharged therefrom at a point near the bottom of the cone-tank n. This tank n is what is known as a "continuous settler," in which the starch settles to the bottom, and is drawn off through the cock n' fast enough to secure the complete settling and the proper density. The waste water, freed of the settling starch, passes off at or near the top of the tank through pipe n². The starch taken from the settling-tank n is emptied into a tank or tanks and treated with caustic alkali, and the whole mass is then run over gutters or tables to effect the final separation of the starch from the few remaining impurities.

As before intimated, we are aware that a disintegrating-machine has been employed in breaking up the steeped corn to free the germs, and that broadly the germs have been separated by mechanical means from the rest of the mass, although such means differ specifically from the separating-tank c and its adjuncts herein shown and reserved as subject-matter for a separate application. We are also aware that a continuous settler, substantially the same as the tank n herein shown and described, as well as its method of operation, is covered by Patent No. 254,239, granted February 28, 1882, to Edwin Roat. We are also aware that a grinding-mill similar to that shown at h and a disintegrator similar to that shown at b' have before been employed in the order above named for manipulating the steeped corn to obtain starch; but it will be observed that we have not only reversed the order of service, but interposed our improved tank for freeing and separating the germs. It will thus be seen that while we have employed old and familiar apparatus with one exception, and utilized manipulations which, when taken separately, are equally well known, our improved process, taken as a whole, is essentially novel, both in the order of manipulations and in its effect upon the steeped and softened grain, thereby producing a greater yield of starch at the finish and reducing to a minimum the presence of those impurities which must necessarily be removed by treatment with an alkali and by settling upon gutters or tables.

We claim—

1. The method of obtaining starch from grain, consisting of the following steps, viz: first subjecting the previously-steeped grain to a beating or breaking action in water without destroying the integrity of the germ, then passing the broken mass into a tank or receptacle from which water is allowed to overflow, such tank being provided with an agitator or agitators which separate the germs from the mass, permitting them to rise and escape with the overflowing water, then grinding the residuum in a mill to thoroughly separate the adhering starch from the bran, and then effecting a final separation of the starch, milk, and bran upon a vibrating sieve, substantially as shown and described.

2. The method of obtaining starch from grain, consisting of the following steps, viz: first subjecting the previously-steeped grain to a beating or breaking action in water without destroying the integrity of the germ, then passing the broken mass into a tank or receptacle, from which water is allowed to overflow, such tank being provided with an agitator or agitators which separate the germs from the mass, permitting them to rise and escape with the overflowing water, then separating the bran and starch adhering thereto from the starch-milk, then grinding the residuum in a mill to thoroughly separate the adhering starch from the bran, and then effecting a final separation of the starch-milk and bran upon a vibrating sieve, substantially as shown and described.

3. The method of obtaining starch from grain, consisting of the following steps, viz: first subjecting the previously-steeped grain to a heating or breaking action in water without destroying the integrity of the germ, then passing the broken mass into a tank or receptacle from which water is allowed to overflow, such tank being provided with an agitator or agitators which separate the germs from the mass, permitting them to rise and escape with the overflowing water, then grinding the residuum in a mill to thoroughly separate the adhering starch from the bran, then effecting a final separation of the starch-milk and bran upon a vibrating sieve, and finally conducting the starch-milk into a continuous settler, where the starch is separated from the water, substantially as shown and described.

4. The method of obtaining starch from grain, consisting of the following steps, viz: first subjecting the previously-steeped grain to a beating or breaking action in water without destroying the integrity of the germ, then passing the broken mass into a tank or receptacle from which water is allowed to overflow, such tank being provided with an agitator or agitators which separate the germs from the mass, permitting them to rise and escape with the overflowing water, then separating the bran and starch adhering thereto from the starch-milk, then grinding the residuum in a mill to thoroughly separate the adhering starch from the bran, then effecting a final separation of the starch-milk and bran upon a vibrating sieve, and finally conducting the starch-milk into a continuous settler, where the starch is separated from the water, substantially as shown and described.

In testimony whereof we have signed our names to this specification in the presence of two subscribing witnesses.

GILBERT S. GRAVES.
ROGER W. GRAVES.

Witnesses:
OTTO HODDICK,
W. T. MILLER.